(12) United States Patent
Laut

(10) Patent No.: US 6,883,663 B2
(45) Date of Patent: Apr. 26, 2005

(54) STRETCHABLE MEDIA DISK PACKAGING

(76) Inventor: Steven Laut, 3280 Kips Korner Rd., Norco, CA (US) 92860

( * ) Notice: Subject to any disclaimer, the term of this patent is extended or adjusted under 35 U.S.C. 154(b) by 93 days.

(21) Appl. No.: 10/387,262

(22) Filed: Mar. 11, 2003

(65) Prior Publication Data
US 2004/0178090 A1 Sep. 16, 2004

(51) Int. Cl.[7] ............................................. B65D 85/57
(52) U.S. Cl. ................................ 206/308.1; 206/303
(58) Field of Search .................. 206/308.1, 309–313, 206/303–304.2

(56) References Cited

U.S. PATENT DOCUMENTS

| | | | | |
|---|---|---|---|---|
| 2,019,988 A | * | 11/1935 | Lyon | 206/304.2 |
| 5,529,182 A | * | 6/1996 | Anderson et al. | 206/308.1 |
| 5,533,615 A | * | 7/1996 | McCamy | 206/308.1 |
| 5,791,467 A | * | 8/1998 | Mahone | 206/308.1 |
| 6,612,433 B2 | * | 9/2003 | McKenzie | 206/308.1 |
| 2004/0055910 A1 | * | 3/2004 | Boorman | 206/308.1 |

* cited by examiner

Primary Examiner—Bryon P. Gehman
(74) Attorney, Agent, or Firm—Blakely, Sokoloff, Taylor and Zafman; Steven Laut

(57) ABSTRACT

A media disk holder is presented. The media disk holder includes a first portion having a center hub and a second portion. The second portion includes a thru-hole. The second portion is stretchable allowing insertion of a media disk having a center hole through the thru-hole onto the first portion with the center hub fitting through the media disk's center hole.

21 Claims, 12 Drawing Sheets

STRETCHABLE MEDIA DISK PACKAGING

BACKGROUND

1. Field

This invention relates to media disk packaging, and more particularly to media disk packaging designed hold a compact disk (CD), software disk, digital versatile disk (DVD), and the like, be tossed without a high probability of causing injury to persons or animals, or damage to the media disk, and insulate from harmful elements, such as dust, temperature, etc.

2. Description of the Related Art

Media disks, such as compact disks (CDs), digital versatile disks (DVDs), software disks, and the like, are typically packed in what is known as a jewel case, that is made out of either hard or soft plastic material or the like. The jewel cases are typically designed in a square or clamshell shape. Other types of media disk packaging can be paper or cardboard packaging with either round or square shape. If a typical media disk package is tossed as a flying disk or Frisbee® into a crowd at an event, such as a musical concert, or promotional event, it is likely that the media disk can be damaged. More importantly, a person attending the event can be injured from the flying media disk package by being impacted with a hard plastic or cardboard disk package.

Also, a problem exists with distributing media disks at events with crowds in that a distributor of media disks typically must hand the media disk packages out to only those people in reach, e.g., the first row of people at a concert. Otherwise, a distributor risks liability damages if one throws the media disk packages into the crowd and injures a person with the media disk package.

BRIEF DESCRIPTION OF THE DRAWINGS

The embodiments are illustrated by way of example and not by way of limitation in the figures of the accompanying drawings in which like references indicate similar elements. It should be noted that references in the specification to "an embodiment," "one embodiment," "some embodiments," or "other embodiments" means that a particular feature, structure, or characteristic described in connection with the embodiments is included in at least some embodiments, but not necessarily all embodiments, of the invention. The various appearances "an embodiment," "one embodiment," or "some embodiments," are not necessarily all referring to the same embodiments. If the specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

DETAILED DESCRIPTION

The invention generally relates to media disks, such as compact disks (CDs), digital versatile disks (DVDs), software disks, or the like, packaging. Referring to the figures, exemplary embodiments of the invention will now be described. The exemplary embodiments are provided to illustrate the invention and should not be construed as limiting the scope of the invention.

Figure 1:
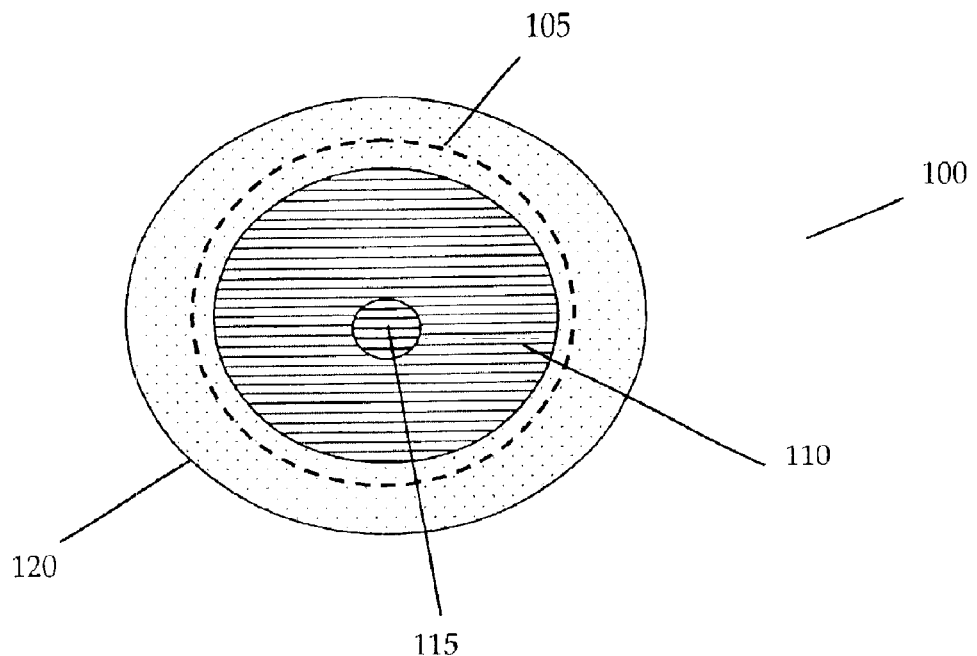
FIG. 1 illustrates a top view of an embodiment.

FIG. 1 illustrates a top view of an embodiment of a media disk holder. Media disk holder 100 includes first portion 110 having center hub 115, and second portion 120 including a thru-hole. Media disk holder 100 is designed to hold media disks such as compact disks (CD), digital versatile disks (DVDs), and similar media disks (i.e., recording disks, software disks, video disks, etc.). Second portion 120 is stretchable allowing insertion of a media disk having a center hole. Insertion of a media disk is possible through second portion's 120 thru-hole. The media disk is placed onto first portion 110 with center hub 115 fitting through the media disk's center hole. It should be noted that typical media disks are roughly either 3 inches in diameter or 4.75 inches in diameter, having a center hole diameter of roughly 11/16 inch. It should also note that media disk holder 100 is sized to fit varying sized media disks, such as 3 inch, 4.75 inch, etc. Media disk holder 100 can vary in thickness to accommodate one or more media disks. The thickness of media disk holder 100 also depends on the type of material used, and design choice (i.e., whether floatable or not, heat/cold resistant or not, type of impact resistance required, etc.).

In one embodiment, first portion 110 and second portion 120 are made of a material having shape "memory." Therefore, media disk holder 100 can be folded, twisted, washed, etc., and will retain its formed shape. In another embodiment, first portion 110 and second portion 120 are made of flexible urethane foam. Other embodiments are made of material such as: polyurethane foam, anti-static polyurethane foam, ethylene vinyl acetate (EVA) foam, polyvinylchloride (PVC) foam, silicone foam, etc. One should note that open cell foam and closed cell foam can also be used in other embodiments. Open cell foam has small pores that allow air and liquid to pass through. Open cell material will absorb some liquid. Closed cell foam is made up of sealed cells that make it resistant to moisture.

In one embodiment, media disk holder 100 is made from a single article (i.e., formed in a single component without separate pieces). In another embodiment first portion 110 and second portion 120 are separate pieces. In this embodiment, first portion 110 and second portion 120 are coupled by known methods such as heat welding, chemical welding (i.e., use of adhesives), etc.

Figure 2:
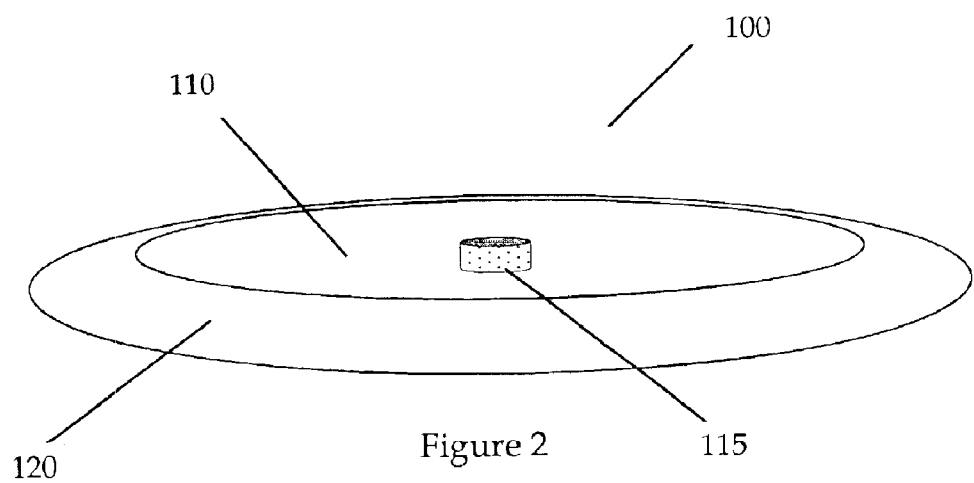
FIG. 2 illustrates a side view of the embodiment illustrated in FIG. 1.

FIG. 2 illustrates a side view of media disk holder 100. As illustrated, media disk holder 100 includes center hub 115. In one embodiment center hub 115 is formed in first portion 110. In one embodiment center hub 115 is slightly smaller than the standard center hole of a media disk (i.e., less than 11/16 inch). In another embodiment, center hub 115 is the same diameter of a standard center hole of a media disk. In this embodiment, center hub 115 forms a snug fit when a media disk center hole is placed over center hub 115. Center hub 115 allows centering of a media disk when inserted into media disk holder 100.

In one embodiment media disk holder 100 floats on bodies of water, such as spas, bathtubs, swimming pools, lakes, oceans, etc. In this embodiment, first portion 110 and second portion 120 are made of closed cell types of foam.

Figure 3:
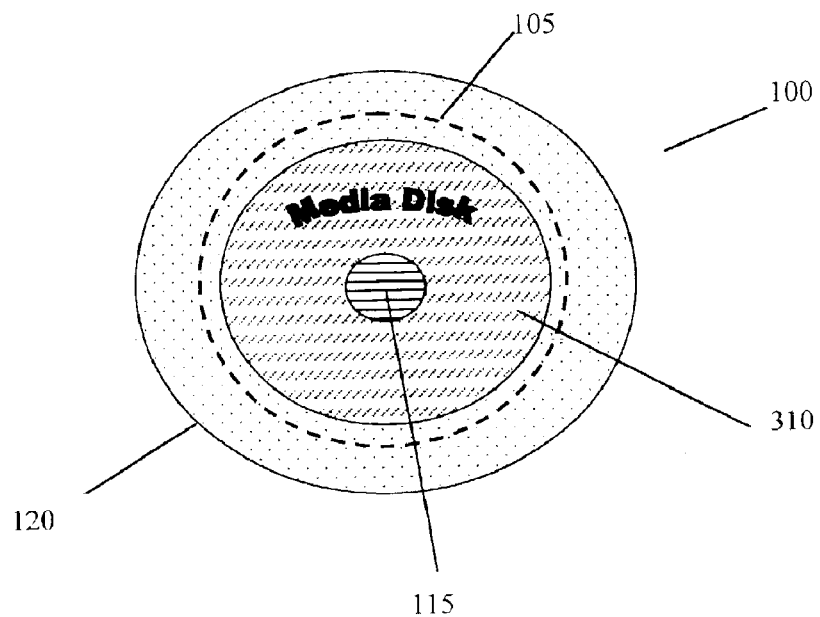
FIG. 3 illustrates the embodiment illustrated in FIG. 1 having a media disk inserted in the embodiment.

In one embodiment the thru-hole of second portion 120 has a diameter less than the diameter of a media disk. In this embodiment, second portion 120 is stretched outward enough so that a media disk can be inserted into media disk 100. Typical stretching is accomplished by a person or machine gripping opposite sides of the media disk holder and applying force outwards from the center. FIG. 3 illustrates media disk 100 having media disk 310 inserted and placed on first portion 110 (not illustrated in FIG. 3) with its center hole inserted over (through) center hub 115. As illustrated, outer diameter 105 of media disk 310 is covered by second portion 120.

Figure 4:
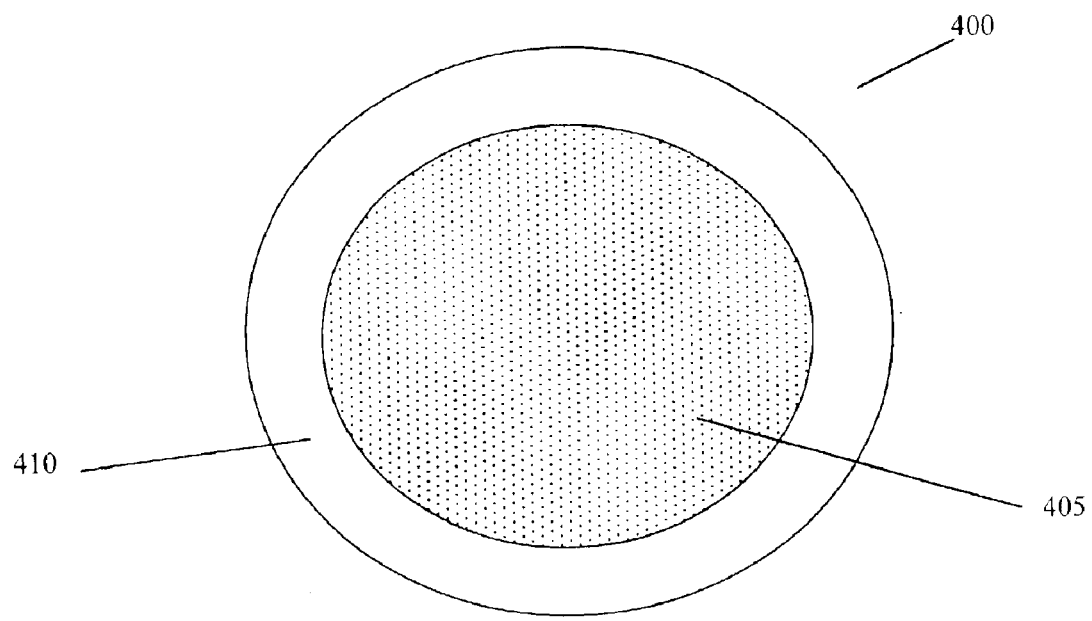
FIG. 4 illustrates a bottom view of another embodiment.

FIG. 4 illustrates an embodiment of media disk holder 400. Media disk 400 is similar to media disk 100 except that media disk 400 includes first portion 110, which has a first side and a second side. The second side of media disk 400 includes recessed portion 405 and outer ridge portion 415. In this embodiment, recessed portion 405 allows for more lift when media disk 400 is thrown parallel to a ground surface. Ridge portion 415 also allows more cushion from a surface by separating recessed portion 415 from a contact surface. Thus, allowing more protection to a media disk when inserted in media disk holder 400 when impacting a surface with ridge portion 415.

Figure 5:
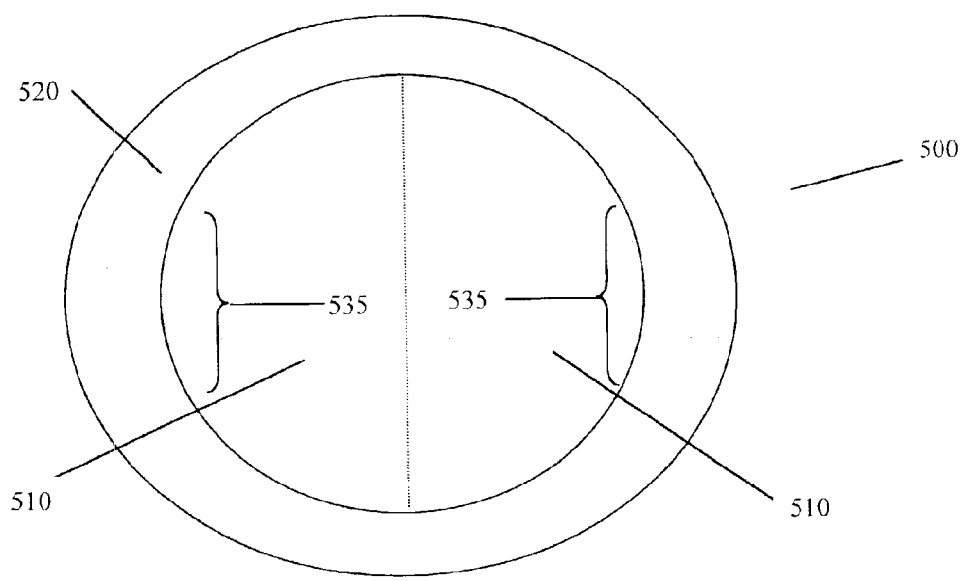
FIG. 5 illustrates a top view of yet another embodiment.

FIG. 5 illustrates media disk holder 500. Media disk holder 500 includes first portion 110 having center hub 115 (illustrated in FIG. 6), second portion 520. Second portion 520 includes first top cover 510 and second top cover 510. Both top covers 510 are flexibly coupled to second portion 520. In one embodiment, top covers 510 are coupled at coupling portions 535. In this embodiment, top covers 510 are formed as part of second portion 520. In another embodiment, top covers 510 are coupled by heat welding or chemical welding to second portion 520. Coupling portions 535 keep top covers 510 in place when top covers 510 are pulled upwards and out to allow insertion of a media disk into media disk holder 500. Second portion 520 is stretchable, allowing a media disk with a larger diameter than the top opening of media disk holder 500 to fit inside when second portion is stretched outward (i.e., a person would exert force on opposing sides of second portion 520, or pull back one side, place the media disk partially in media disk holder 500 and then pull back the opposing side). In another embodiment, second portion 520 has a diameter that is large enough to fit a media disk without having to be stretched. In this embodiment, both top covers 510 are opened allowing for insertion of a media disk without having to stretch opposing sides of second portion 520.

Figure 6:
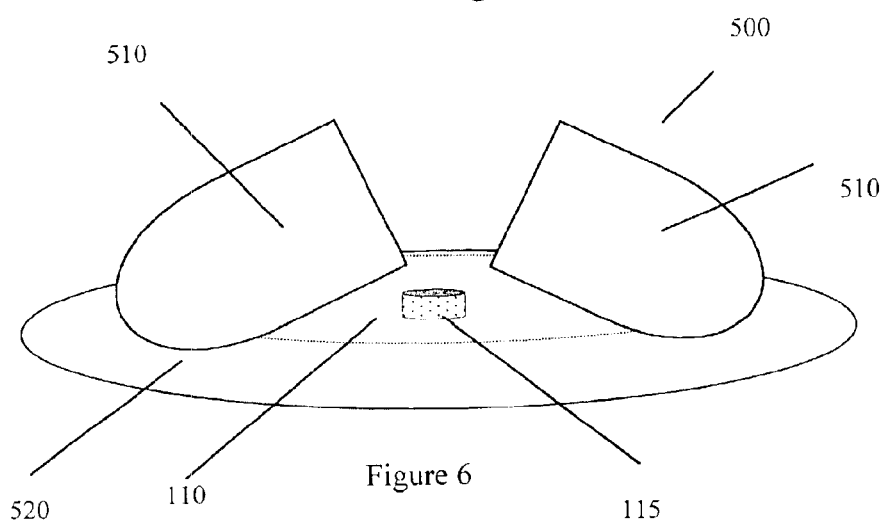
FIG. 6 illustrates a side view of the embodiment illustrated in FIG. 5 having top cover portions folded back.
Figure 6A:
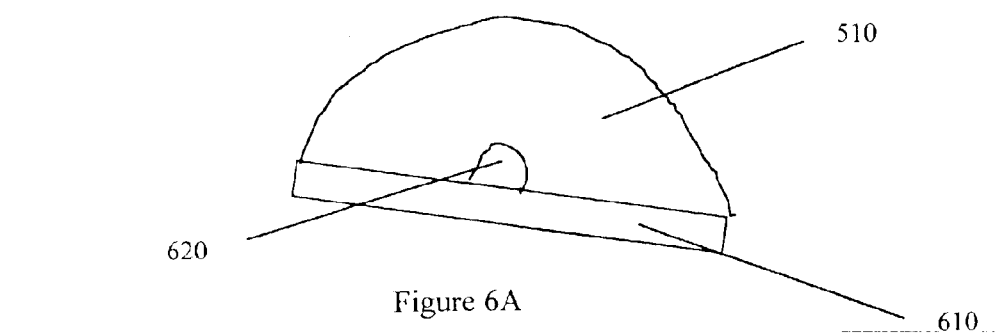
FIG. 6A illustrates a top cover of an embodiment.

FIG. 6 illustrates a side view of media disk holder 500 with top covers 510 opened upward allowing insertion of a media disk. As can be seen, center hub 115 is now exposed. FIG. 6A illustrates top cover 510 having a joining portion 610. Joining portion 610 on each top cover 510 allows both top covers to attach to one another for creating a sealed cover. In one embodiment, joining portion 610 of each top cover 510 has compatible Velcro® strips coupled to it allowing both top covers to fasten to one another. In this embodiment, lifting tab 620 is coupled to at least one top cover 510 allowing a person to separate the two fastened top covers 510. In another embodiment, top covers 510 are heat or chemically fastened together along joining portion 610. In this embodiment, a media disk inserted into media disk holder 500 is sealed. In order to open sealed media disk holder 500, an opening means, such as a pull strip, etc. (not shown) is coupled to the sealed portion allowing a person to break the seal and remove the media disk.

Figure 7:
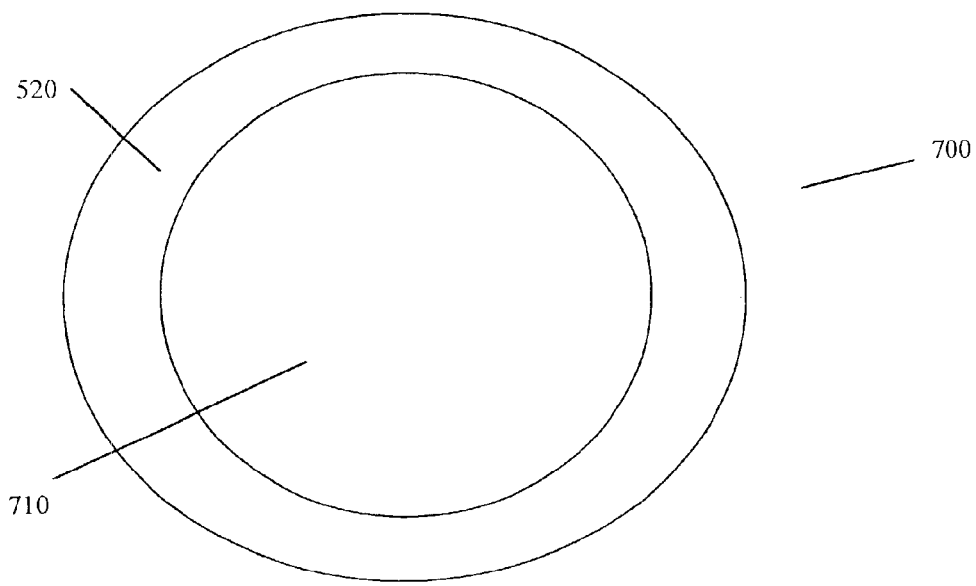
FIG. 7 illustrates a top view of still another embodiment.
Figure 8:
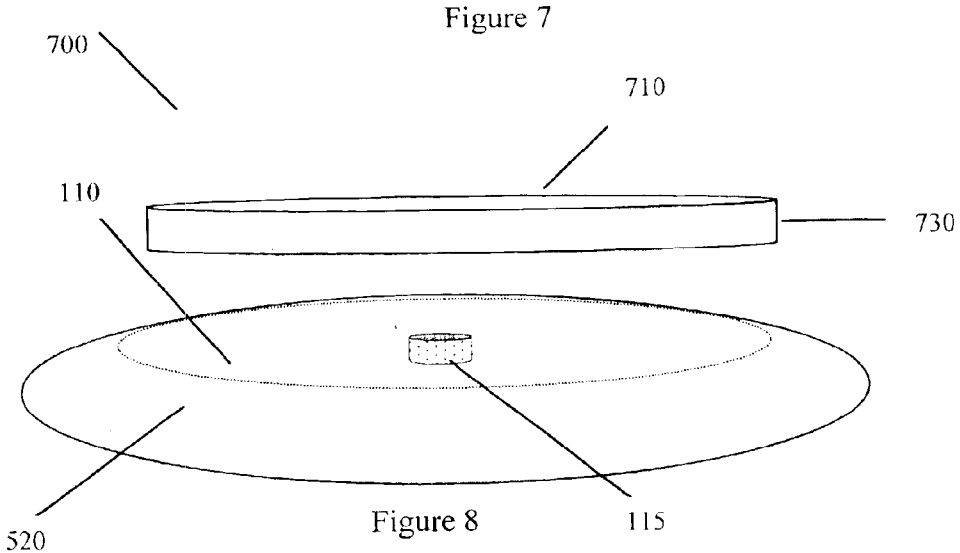
FIG. 8 illustrates a side view of the embodiment illustrated in FIG. 7 having a top cover portion removed.

FIG. 7 illustrates an embodiment of a media disk holder. Media disk holder 700 is similar to media disk 100 and 500 except for single piece top cover 710. As illustrated in FIG. 8, top cover 710 has fastening portion 730. In one embodiment, fastening portion 730 is heat or chemically sealed to second portion 520 when top cover 710 is inserted into the top opening of media disk holder 700. In this embodiment, in order to open sealed media disk holder 700, an opening means, such as a pull strip, etc. (not shown) is coupled to the sealed portion allowing a person to break the seal and remove the media disk. In another embodiment, fastening means, such as compatible Velcro® strips are attached to the top inner portion of second portion 520 and also to fastening portion 730. In this embodiment, a lifting tab (not shown) similar to lifting tab 620 is coupled to the top of top cover 710 to allow removal of top cover 710 from media disk holder 700. In another embodiment, second portion 520 has a diameter that is large enough to fit a media disk without having to be stretched. In this embodiment, when top cover 710 is removed, a media disk can be inserted into media disk holder 700 without having to stretch opposing sides of second portion 520.

Figure 8A:
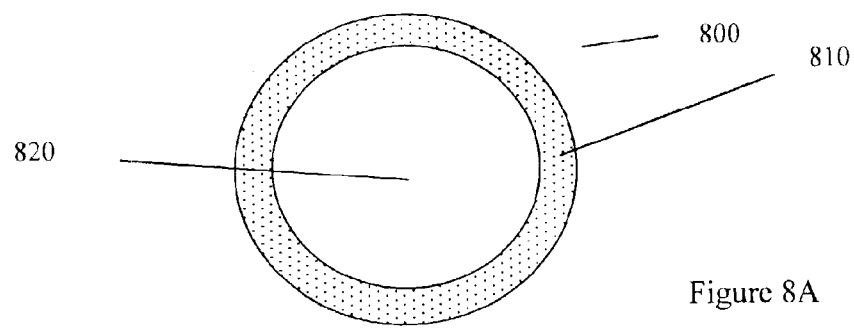
FIG. 8A illustrates an embodiment of a top cover.

In another embodiment, top cover 730 is made of a see-through material (i.e., transparent, translucent, etc.). This material can be a porous open cell type of foam, clear plastic, etc. In one embodiment, top cover 730 fits in a groove surrounding the inner circumference in second portion 520 (not shown). FIG. 8A illustrates another embodiment of a top cover. In this embodiment, top cover 800 includes outer portion 810 and inner portion 820. Outer portion 810 can be a material such as open cell foam, closed cell foam, etc. Inner portion 820 is a transparent material, such as porous open cell foam, clear plastic, etc. In one embodiment, inner portion 820 fits in a groove in outer portion 810. In this embodiment, inner portion 820 is coupled to outer portion 810 by either chemical welding or heat welding. In one embodiment, outer portion 810 couples to second portion 510 in similar ways as top cover 710 couples to second portion 520, as discussed beforehand.

By including a see through top cover or top cover portion in media disk 700, a label of a media disk, advertising, art work, other content, etc. can be seen from outside media disk holder 700.

Figure 9:
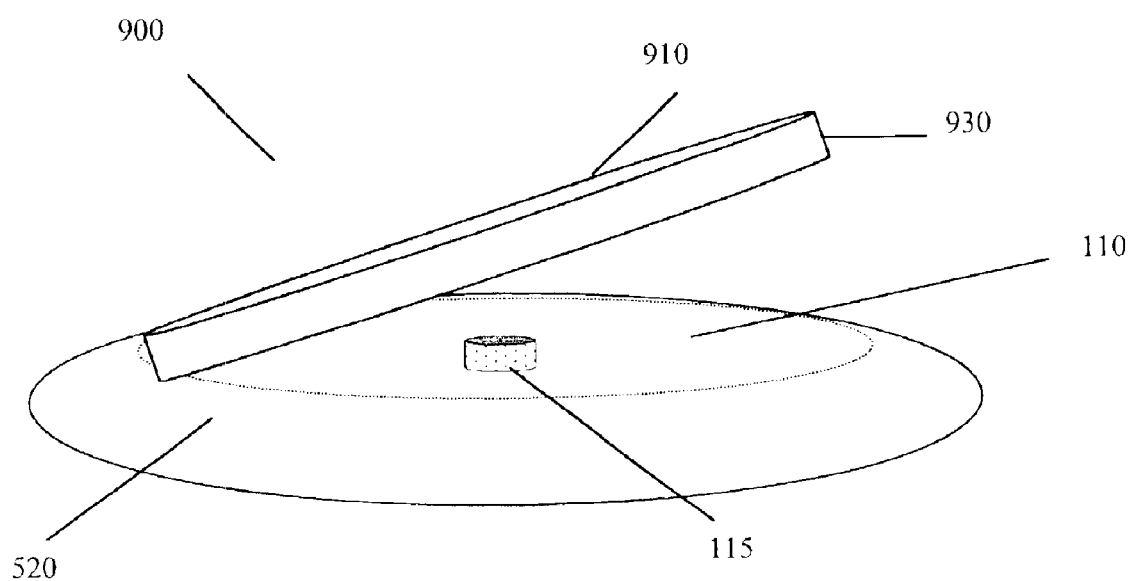
FIG. 9 illustrates a side view of another embodiment having a top cover portion folded upwards.

FIG. 9 illustrates another embodiment of a media disk holder. Media disk holder 900 is similar to media disk 700 except for single piece top cover 910 being attached at one end to second portion 520. As illustrated in FIG. 9, top cover 910 has fastening portion 930. In one embodiment, fastening portion 930 is heat or chemically sealed to second portion 520 when top cover 910 is fully inserted into the top opening of media disk holder 900. In this embodiment, in order to open sealed media disk holder 900, an opening means, such as a pull strip, etc. (not shown) is coupled to the sealed portion allowing a person to break the seal and remove the media disk. In another embodiment, fastening means, such as compatible Velcro® strips are attached to the top inner portion of second portion 520 and also to fastening portion 930. In this embodiment, a lifting tab (not shown) similar to lifting tab 620 is coupled to the top of top cover 910 to allow removal of top cover 910 from media disk holder 900. As illustrated, top cover 910 is coupled to second portion 520 at one end. Therefore, top cover 910 is not removably coupled to media disk holder 900. In another embodiment, second portion 520 has a diameter that is large enough to fit a media disk without having to be stretched. In this embodiment, when top cover 910 is opened a media disk can be inserted into media disk holder 900 without having to stretch opposing sides of second portion 520.

Figure 10:
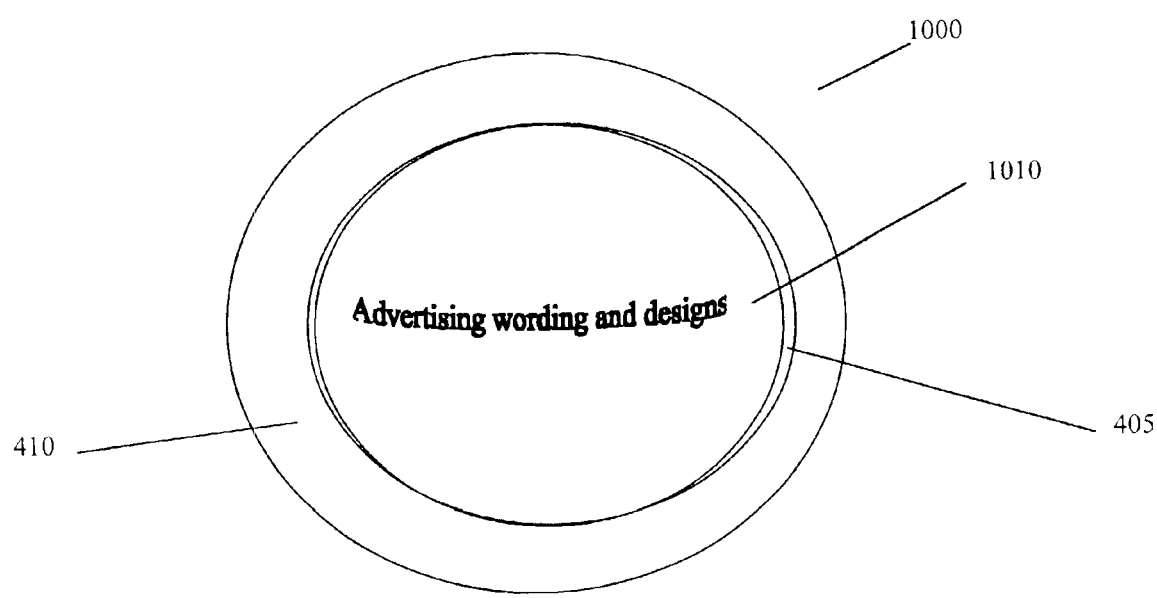
FIG. 10 illustrates an embodiment having a thin covering coupled to a top surface.

FIG. 10 illustrates an embodiment of a media disk holder. Media disk holder 1000 having a smooth material layer 1010 coupled to recessed portion 405. Material layer 1010 is coupled to recessed layer 405 by conventional means, such as heat welding, chemical welding, adhesives, etc. Material layer 1010 can be printed on to display advertising or art work. It should be noted that material layer 1010 can be coupled to the other discussed embodiments above and below.

Figure 11:
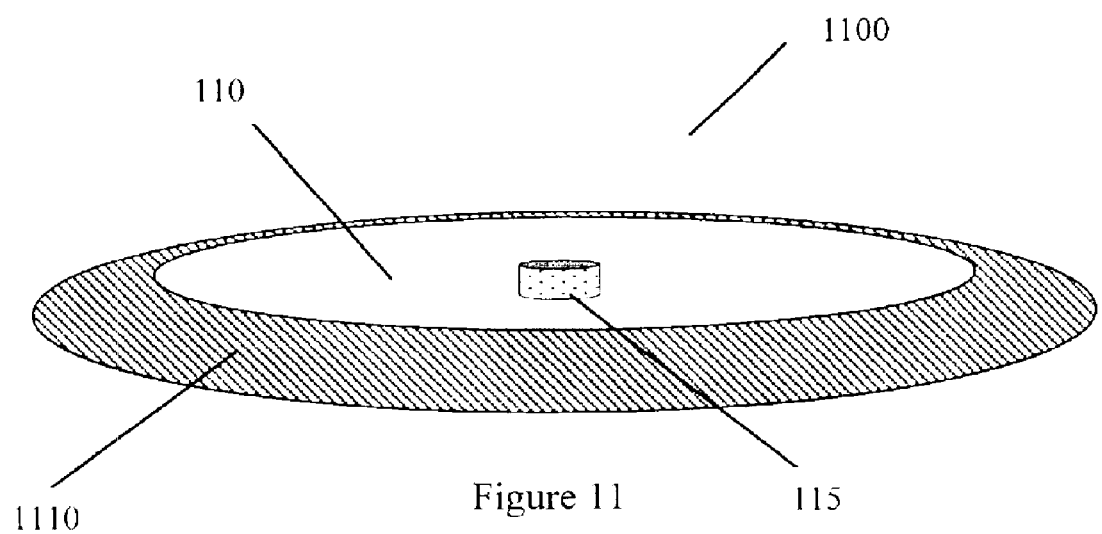
FIG. 11 illustrates an embodiment having a thin covering coupled to a side surface.

FIG. 11 illustrates an embodiment of a media disk holder. Media disk holder 1100 includes a coupled material portion 1110. Material portion 1110 is similar to material layer 1010, except material portion 1110 is attached to a portion of media disk holder 1100, such as second portion 120, or 520. Material layer 1110 can be printed on to display advertising or art work. It should be noted that material layer 1110 can be coupled to the other discussed embodiments above and below.

Figure 12:
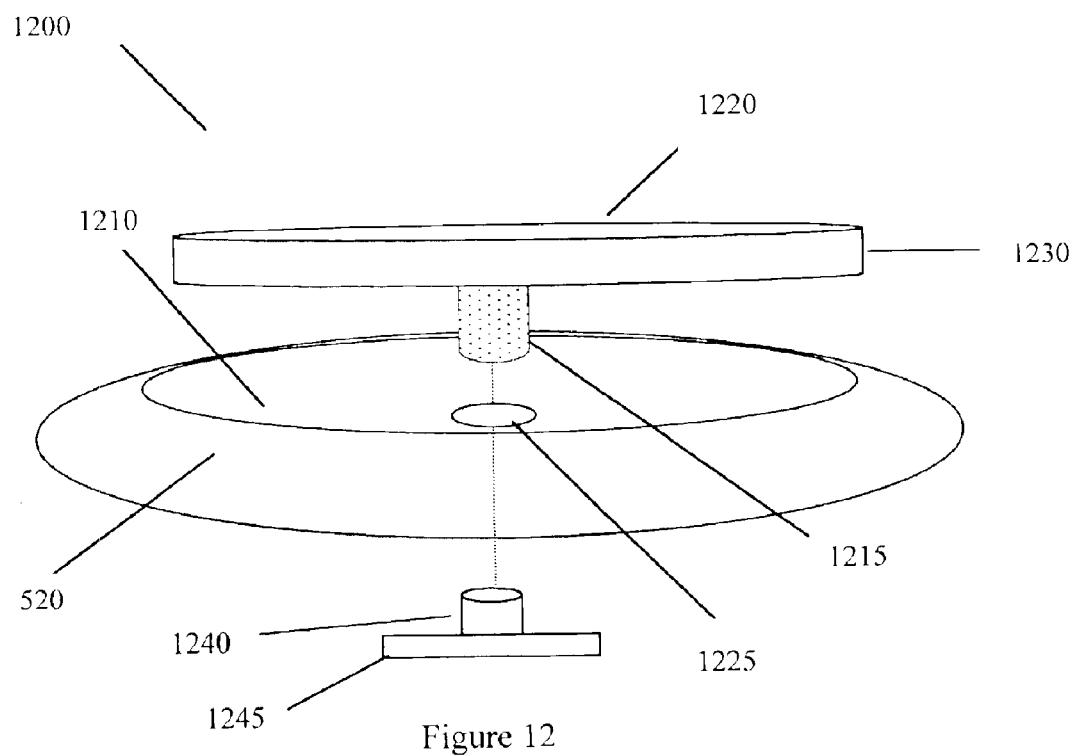
FIG. 12 illustrates an embodiment having a media disk-locking device.

FIG. 12 illustrates an embodiment of a media disk holder having attachment means therethrough. Media disk holder 1200 includes top cover portion 1220, first portion 1210, second portion 520, and first locking portion 1240. First portion 1210 has centered thru-hole 1225. Top cover portion 1220 includes second locking portion 1215. Second locking portion 1215 is coupled to top cover portion 1220 by chemical welding, heat welding, adhesives, etc. First locking portion 1240 and second locking portion lock together preventing an inserted media disk in media disk holder 1200 from being removed. In one embodiment, first locking portion 1240 fits through thru-hole 1225 and within second locking portion 1215. In this embodiment, first locking portion 1240 is screwed into second locking portion 1215, where second locking portion is threaded (not shown). In another embodiment, first locking portion 1240 is snap locked into second locking portion 1215. In this embodiment, first locking portion 1240 includes a spring release (i.e., a button) that releases first locking portion 1240 from second locking portion 1215 (not shown). It should be noted that other locking/unlocking means known in the art can be used to keep top cover 1220 coupled with media disk holder 1200 (e.g., twist locks, snaps, etc.). In another embodiment, second locking portion 1215 fits through thru-hole 1225 and within first locking portion 1240.

As illustrated in FIG. 12, first locking portion 1240 has flange 1245. In one embodiment, flange 1245 is circular and fits flush against the bottom portion of media disk holder 1200. In one embodiment, first locking portion 1240 and second locking portion 1215 are made of a sturdy plastic. In one embodiment, coupling portion 1230 of top portion 1220 is attached to second portion 520 by chemical welding, heat welding, etc. In this embodiment, top portion 1220 seals a media disk that is inserted into media disk holder 1200. In order to release the seal, a pull string, or other releasing device known in the art can be employed. Once the seal is broken, first locking portion 1240 and second locking portion 1215 are unlocked allowing removal of an inserted media disk. Since first locking portion 1240 and second locking portion 1215 are reattachable, a media disk can be placed back into media disk holder 1200 after the seal is broken. Thus, a media disk can be secured by relocking first locking portion 1240 and second locking portion 1215.

In one embodiment, first locking portion 1240 is of a diameter to snugly fit through a standard media disk center thru-hole. In another embodiment, second locking portion 1215 is of a diameter to snugly fit through a standard media disk center thru-hole. In these embodiments, either locking portion holds an inserted media disk snugly within media disk holder 1200.

In another embodiment, top cover portion 1220 is reversed and inserted through the bottom of media disk holder 1200 (not shown). In this embodiment, second portion 520 does not have a thru-hole on the top part of media disk holder 1200. First portion 1210 in this embodiment has a bottom thu-hole for inserting top cover portion 1220. In other words, the media disk holder reverses the way in which a cover is inserted, i.e., instead of through the top, it is inserted through the bottom. Therefore, a media disk is inserted through the bottom instead of through the top of media disk holder 1200. In another embodiment, the insertion portion (i.e., where the media disk is inserted into the media disk holder) has a diameter that is large enough to fit a media disk without having to stretched the insertion opening.

Figure 13:
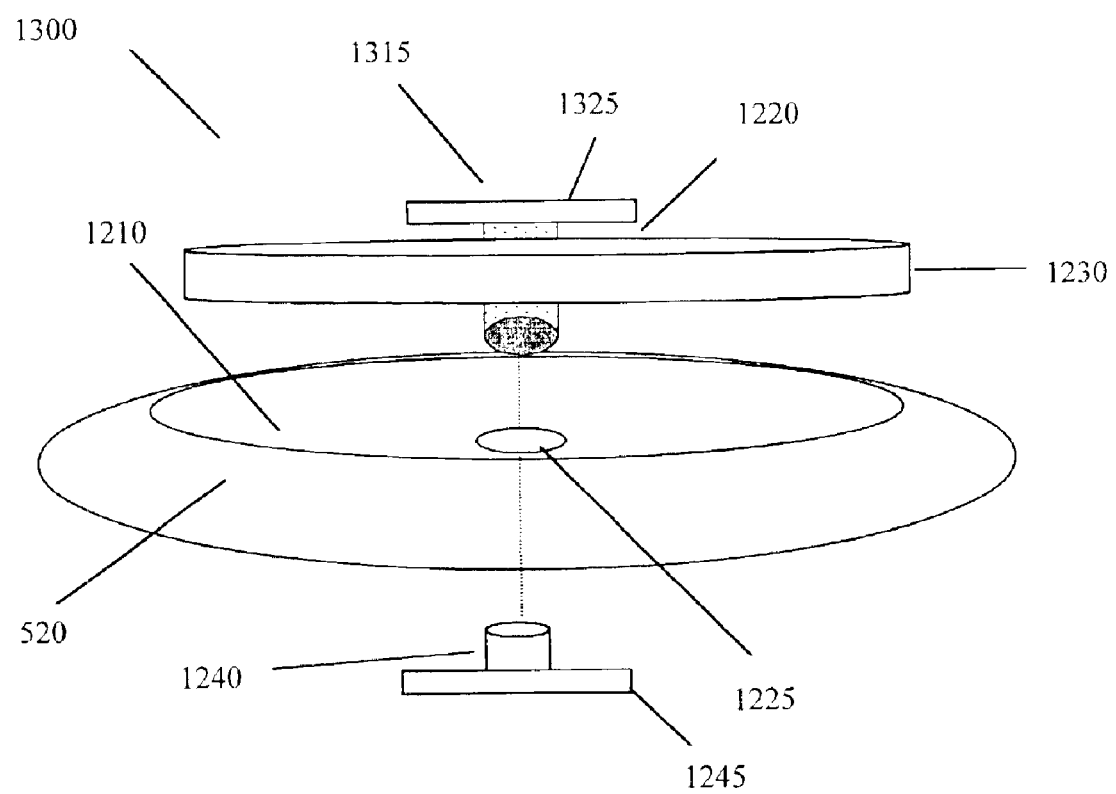
FIG. 13 illustrates an embodiment having a media disk with an alternate-locking device.

FIG. 13 illustrates an embodiment of a media disk holder having first locking portion 1315 and second locking portion 1240. Media disk holder 1300 is similar to media disk holder 1200 except second locking portion 1315 is removable from top cover portion 1220. Second locking portion 1315 includes flange portion 1325. Flange portion 1325 couples flushly with top cover portion 1220 when inserted through a center thru-hole (not shown) in top cover portion 1220. In one embodiment, second locking portion 1315 is made of a sturdy plastic material. First locking portion 1240 and second locking portion 1315 couple together to lock top cover portion to media disk holder 1300. The above locking devices and means discussed in relation to first locking portion 1240 and second locking portion 1215 (illustrated in FIG. 12) can also be used for locking first locking portion 1240 to second locking portion 1315.

Figure 14:
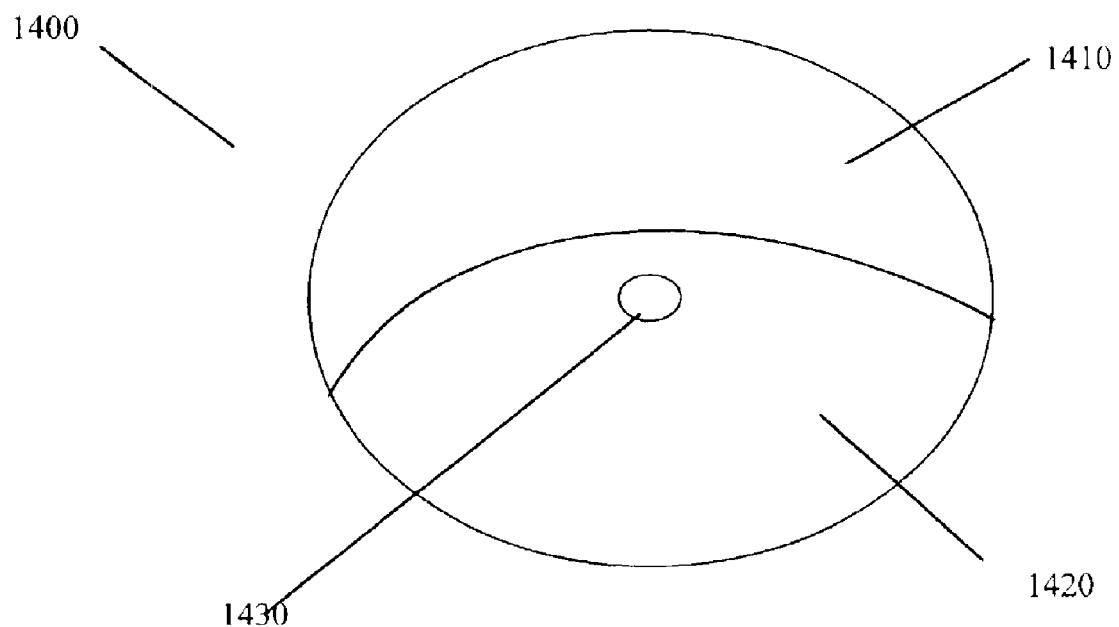
FIG. 14 illustrates a media disk protection sleeve.

FIG. 14 illustrates sleeve 1400. Sleeve 1400 includes lower portion 1420, upper portion 1410 and thru-hole 1430. Upper portion 1410 is flexible enough to insert a standard media disk. It should be noted that sleeve 1400 is sized to fit standard media disk diameters (e.g., 3 inch diameter, 4.75 inch diameter, etc.). In one embodiment, sleeve 1400 is made of a static preventing material, such as mylar. In other embodiments, sleeve 1400 is made of other materials, such as plastic, vinyl, etc. Sleeve 1400 can be used with the above appropriate embodiments (i.e., embodiments with a center thru-hole in the bottom of the respective media disk holder) to give additional protection from harmful material (e.g., dust, dirt, etc.). Also, sleeve 1400 allows stacking of more than one media disk into a media disk holder. Therefore, sleeve 1400 prevents media disks from contacting directly with one another when stacked.

In one embodiment, Sleeve 1400 does not have thru-hole 1430 (not shown). In this embodiment, sleeve 1400 does not have thru-hole 1430 for media disk holders not having a thru-hole in their bottom portion. This embodiment of sleeve 1400 can be used with the above appropriate embodiments (i.e., embodiments without a center thru-hole in the bottom of the respective media disk holder) to give additional protection from harmful material (e.g., dust, dirt, etc.). Also, sleeve 1400 allows stacking of more than one media disk into a media disk holder. Therefore, sleeve 1400 prevents media disks from contacting directly with one another when stacked.

In another embodiment, top cover portion 1220 is reversed and inserted through the bottom of media disk holder 1300 (not shown). In this embodiment, second portion 520 does not have a thru-hole on the top part of media disk holder 1200. First portion 1210, in this embodiment, has a bottom thu-hole for inserting top cover portion 1220. In other words, the media disk holder reverses the way in which a cover is inserted, i.e., instead of through the top, it is inserted through the bottom. Therefore, a media disk is inserted through the bottom instead of through the top of media disk holder 1300.

Figure 15:
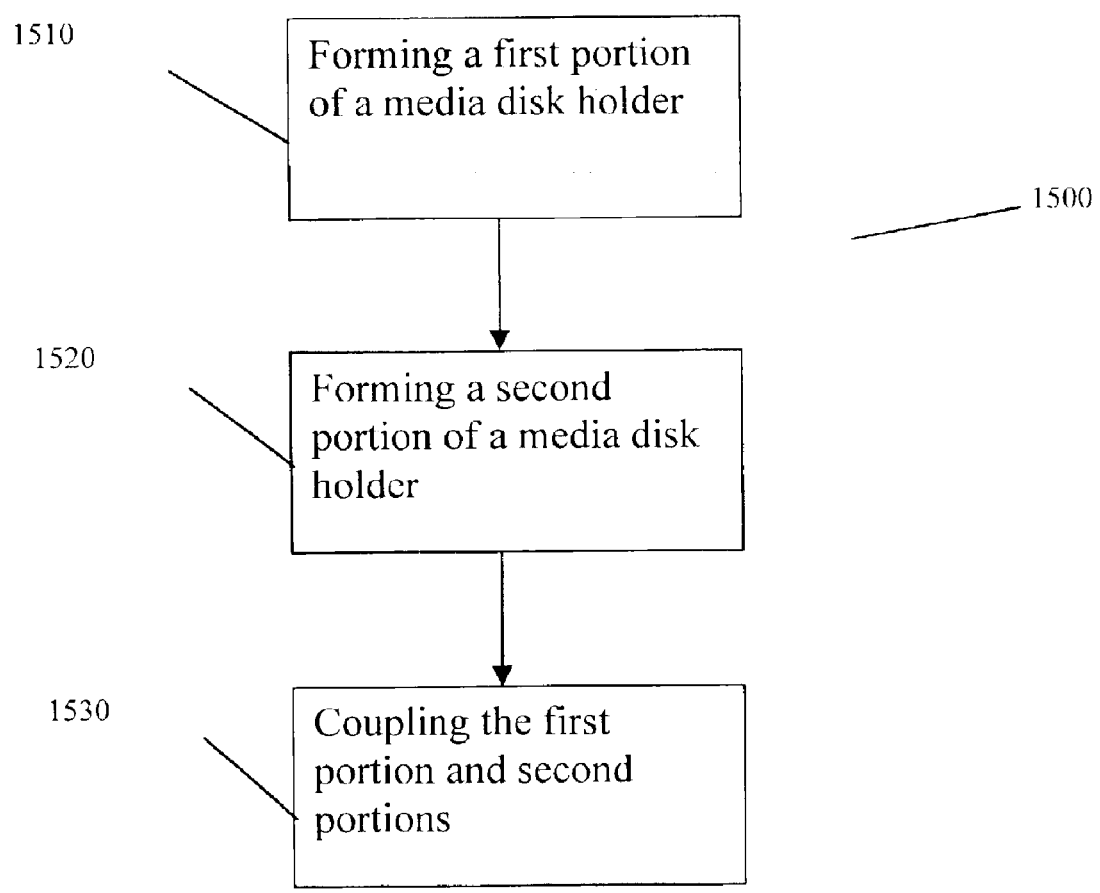
FIG. 15 illustrates a block diagram of a process for manufacturing a media disk package.

FIG. 15 illustrates a block diagram of a process for manufacturing a media disk holder. In block 1510, a first portion of a media disk holder, such as first portion 110 (illustrated in FIG. 1), is formed. The first portion of the media disk holder includes a thru-hole. In this embodiment, the thru-hole has a diameter less than the size of a standard media disk. The first portion is stretchable, allowing a media disk larger than the unstretched thru-hole to be placed through the thru-hole. The first portion is formed from a foam material, such as a closed cell or open cell type of polyurethane foam. Forming techniques, such as injection molding, cutting, using a heat wire for cutting, pultrusion, etc. are used to form the first portion of the media disk holder. In another embodiment, the thru-hole has a diameter equal to or greater than the size of a standard media disk. After block 1510 is completed, block 1520 commences. In block 1520, a second portion of a media disk holder is formed. The second portion of a media disk holder is formed using similar techniques for forming the first portion. The second portion includes a center hub formed on a first side. In one embodiment, the center hub is of the same diameter as a center hole of a standard media disk. In another embodiment, the center hub is slightly larger than the standard center hole of a media disk. The center hub fits through a media disk's center hole and acts to center a media disk that is placed onto the second portion.

After block 1520 is completed, process 1500 continues with block 1530. In block 1530, the first and second portions of a media disk holder are coupled together. In one embodiment, the first and second portions are coupled by heat welding the two portions together. In another embodiment, chemical welding is used to couple the first and second portions together. In one embodiment, process 1500 includes another block (not shown) for inserting a media disk into the media disk holder. The package of a media disk and a media disk holder can then be modified by adhering other materials for advertising or artistic work. The total package can be shrink wrapped and distributed. Because the media disk holder is made of a material having memory shape, many media disk holders can be placed in a container for shipping in a compressed state. When the media disk holders are removed from the shipping container, because the material has memory shape, the media disk holders return to their normal shape.

Figure 16:
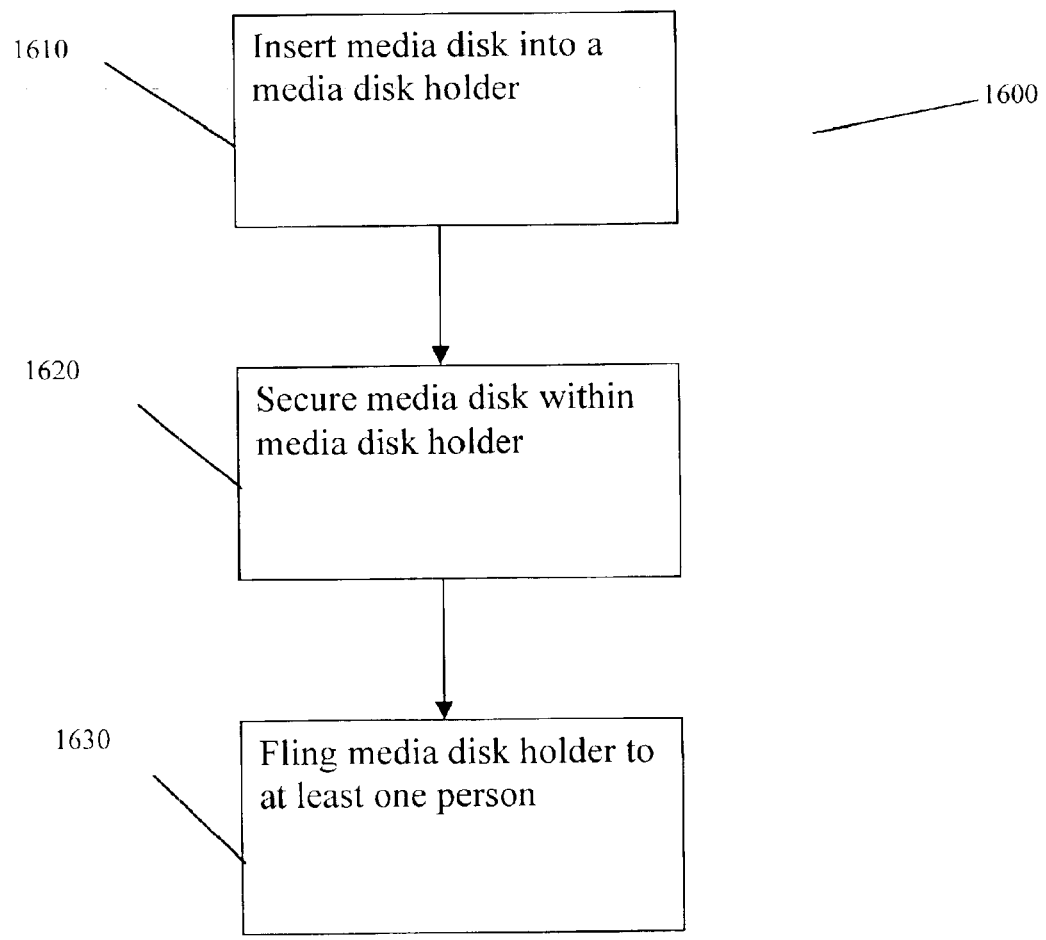
FIG. 16 illustrates a block diagram of a process for distributing media disks to at least one person.

FIG. 16 illustrates a process of distributing at least one media disk. Process 1600 commences with block 1610. In block 1610 a media disk is inserted into a media disk holder, such as media disk holder 100, 400, 700, 900, 1000, 1100, 1200, and 1300. In one embodiment, a media disk is inserted within a media disk holder by a person. In another embodiment, a mechanical loading device is used to insert a media disk into the media disk holder. It should be noted that more than a single media disk can be inserted into the discussed media disk holder embodiments. In one embodiment, the inserted media disk includes a center hole. The media disk holder includes a center hub, a first portion, and a second portion attached to the first portion. The second portion includes a thru-hole. The second portion is flexible allowing insertion of a media disk through the thru-hole onto the center hub. Process 1600 then continues with block 1620. In block 1620, a media disk is secured within the media disk holder. The media disk is secured by any of the disclosed means for locking a disk with a media holder, securing a top cover over the media disk, etc. Process 1600 then continues with block 1630.

In block 1630, a media disk holder including a media disk is flung to at least one person. By the terms flung, fling, flinging, it is meant that a media disk holder is thrown by tossing the media disk holder, as one would toss a disk shaped object. Typically, one would toss a disk shaped object by holding the disk from one side. A side arm motion is made releasing the disk when one's arm is extended. Therefore, when the media disk holder is flung, it glides through the air carrying the enclosed media disk. This process of distributing media disks can be used to distribute media disks at concerts, to crowds, at promotional events, etc. In another embodiment, flinging is done by mechanical means, such as a machine similar to a skeet machine, football-tossing machine, pitching machine, etc.

If the media disk holder comes in contact with a person or fixed object, the media disk inside is protected by the cushioning effect of the media disk holder material and construction. Therefore, reducing the likelihood of injury to a person if the media disk holder impacts with a person, and reducing the likelihood of damage to the media disk if the media disk holder impacts with a fixed object. The process of distributing the media disk in one of the above described embodiments of a media disk holder can also be used in promoting products by including advertising or literature along with a media disk. Also, the problem of only being able to distribute media disks to persons in close proximity to a distributor is overcome. This problem arises due to safety concerns of people and damage to a media disk if a typical jewel case or cardboard container including a media disk is thrown into a crowd. Thus, media disks are typical only handed out. With the above embodiments of media disk holders, a media disk can be flung into a crowd without the fear of damaging the media disk or injuring a person. Thus, media disks can be distributed to people further away from a distributor without the distributor having to hand out the media disks.

The above discussed media disk holder embodiments absorb energy (i.e., cushions), seal, protect against shock loads, and insulate against temperature. Thus, the discussed embodiments protect an inserted media disk from damage when a media disk holder embodiment is thrown, comes in contact with water (i.e., put in a pool, ocean, lake, etc.), is subjected to extreme temperature, or is shipped (i.e., handled roughly, transported in extreme temperatures, etc.). Therefore, these media disk holder embodiments reduce warping from extreme heat, cracking due to extreme cold, damage due to impact, etc.

It should be noted that the above embodiments can also be fitted with small electronic devices, such as lighting and/or sound. If lighting and/or sound devices are added to the above described embodiments, additional material of closed or open cell foam is necessary to provide cushioning. Therefore, the lighting or sound producing devices would need to be recessed and/or hidden to reduce the likelihood of injury when the embodiment is thrown at/to at least one person, or impacts an object. Also, different designs or shapes of the above embodiments will not alter the scope of the embodiments. Therefore, when a ridge, oval, smooth shape is illustrated, other shapes can also be implemented, such as stepped layers, ramped layers, etc.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A media disk holder, comprising:
   a first portion having a center hub, and
   a second portion, said second portion including a thru-hole having a diameter smaller than a media disk having a center hole,
   wherein said second portion is stretchable outward from the thru-hole to increase the diameter of the thru-hole allowing insertion of the media disk through said thru-hole onto said first portion with said center hub fitting through the media disk's center hole.

2. The media disk holder of claim 1, wherein said first portion and said second portion are made of a material having shape memory.

3. The media disk holder of claim 1, said first portion and said second portion are made of one of open cell foam and closed cell foam.

4. The media disk holder of claim 1, wherein the media disk is one of a compact disk (CD) and a digital versatile disk (DVD).

5. The media disk holder of claim 1, said first portion and said second portion are separate pieces, wherein said first portion and said second portion are coupled.

6. The media disk holder of claim 1, said first portion and said second portion are formed as a single article.

7. The media disk holder of claim 1, wherein the media disk has a diameter larger than said second portion's thru-hole.

8. The media disk holder of claim 1, said first portion has a first side and a second side, wherein the second side includes a recessed portion and an outer ridge portion.

9. The media disk holder of claim 1, said second portion including a first top cover and a second top cover both flexibly coupled to said second portion,
wherein said first and second top covers allow insertion of the media disk through said thru-hole onto said first portion with said center hub fitting through the media disk's center hole when said first and second top covers are flexed upwardly apart.

10. The media disk holder of claim 1, further comprising:
    a third portion removably coupled within said thru-hole,
wherein removal of said third portion allows insertion of the media disk onto said first portion with said center hub fitting through the media disk's center hole when said thru-hole is stretched outward from said center hub.

11. The media disk holder of claim 10, wherein said third portion is made of a see through material allowing viewing of a top portion of said first portion or a media disk if said media disk is inserted within said media holder.

12. The media disk holder of claim 1, further comprising:
    a third portion partially coupled within said thru-hole,
wherein flexing upward of a non-coupled portion of said third portion allows insertion of the media disk onto said first portion with said center hub fitting through the media disk's center hole when said thru-hole is stretched outward from said center hub.

13. A method of manufacturing a media disk holder, comprising:
    forming a first portion of said media disk holder, said first portion having a thru-hole having a diameter smaller than a media disk having a center hole;
    forming a second portion of said media disk holder, said second portion having a center hub formed on a first side;
    coupling said first portion with said second portion,
    wherein first portion is stretchable outward from the thru-hole to increase the diameter of the thru-hole allowing insertion of the media disk through said thru-hole onto said center hub to lay flush with said second portion.

14. The method of manufacturing a media disk holder of claim 13, wherein the first portion is formed from one of a closed cell foam and a open cell foam.

15. The method of manufacturing a media disk holder of claim 13, further comprising:
    inserting a media disk into the media disk holder.

16. The method of manufacturing a media disk holder of claim 13, further comprising:
    adhering material for one of advertising and artistic work to one of said first portion of the media disk holder and said second portion of the media disk holder.

17. The method of manufacturing a media disk holder of claim 13, further comprising,
    forming a first top cover and a second top cover, and
    coupling said first top cover and said second top cover to said second portion.

18. The method of manufacturing a media disk holder of claim 13, further comprising,
    forming a third portion, wherein said third portion is removably coupled within said thru-hole.

19. The method of manufacturing a media disk holder of claim 18, wherein said third portion is made of a see through material allowing viewing of a top portion of said first portion or a media disk if said media disk is inserted within said media holder.

20. The method of manufacturing a media disk holder of claim 13, further comprising:
    forming a third portion, and
    partially coupling said third portion within said thru-hole.

21. The method of manufacturing a media disk holder of claim 13, wherein said first portion has a first side and a second side, the second side formed with a recessed portion and an outer ridge portion.

* * * * *